United States Patent [19]

Fowler

[11] 4,125,431
[45] Nov. 14, 1978

[54] TANDEM MIRROR PLASMA CONFINEMENT APPARATUS

[75] Inventor: T. Kenneth Fowler, Walnut Creek, Calif.

[73] Assignee: The United States of America as represented by the United States Department of Energy, Washington, D.C.

[21] Appl. No.: 807,081

[22] Filed: Jun. 16, 1977

[51] Int. Cl.² .................................................. G21B 1/00
[52] U.S. Cl. .................................. 176/3; 176/5; 176/9
[58] Field of Search ........................... 176/1, 3, 5, 7, 9

[56] References Cited

U.S. PATENT DOCUMENTS

| | | | |
|---|---|---|---|
| 3,101,310 | 8/1963 | Post | 176/7 |
| 3,170,841 | 2/1965 | Post | 176/5 |
| 3,437,871 | 4/1969 | Cann et al. | 176/7 |
| 3,655,508 | 4/1972 | Hirsch | 176/7 |
| 3,688,067 | 6/1972 | Christofilos | 176/5 |
| 3,723,703 | 3/1973 | Ehlers et al. | 176/1 |
| 3,728,217 | 4/1973 | Dandl | 176/3 |
| 3,755,073 | 8/1973 | Haught et al. | 176/1 |

OTHER PUBLICATIONS

1 Plasma Physics, 503 (1967), pp. 503–505, Kelley.
2 Soviet Journal of Plasma Physics, 597 (July–August 1976) Dimov et al.
"Open Trap with Ambipolar Mirrors", Dimov et al., Proc. 6th Int. Conf. Plas. Phys. & CNF Research (10/6-131-76), UCRL, 50002-75, pp. 1-140.

Primary Examiner—Samuel W. Engle
Assistant Examiner—S. A. Cangialosi
Attorney, Agent, or Firm—Dean E. Carlson; R. S. Gaither; P. Martin Simpson, Jr.

[57] ABSTRACT

Apparatus and method for confining a plasma in a center mirror cell by use of two end mirror cells as positively charged end stoppers to minimize leakage of positive particles from the ends of the center mirror cell.

34 Claims, 8 Drawing Figures

TANDEM MIRROR PLASMA CONFINEMENT APPARATUS

This application is related to the United States Energy Research and Development Administration application Ser. No. 807,082, filed concurrently herewith.

FIELD OF INVENTION

This invention pertains to the confinement of plasmas by magnetic fields.

The invention described herein was made at Lawrence Livermore Laboratory in the course of, or under, Contract AEC-7405-ENG-48 with the United States Energy Research and Development Administration.

BACKGROUND OF THE INVENTION (a) Field

Apparatuses employed for the containment of plasmas by magnetic fields may utilize many varied configurations. Two well-known categories of these machines are the open-ended type such as the magnetic mirror and the toroidal type such as the tokamak and the stellarator. One advantage to the toroidal type is that a trapped charged particle must move laterally across magnetic field lines to escape confinement. Hereinafter, positive ions will be designated simply as "ions." Since the ions tend to remain in a spiral orbit about a given set of magnetic field lines, the continuity of the magnetic field lines inside the apparatus enhances containment.

An apparatus of the open-ended type has the disadvantage that the trapped charged particles may escape while traveling along the magnetic field lines which define their spiral orbits. The magnetic field lines do not close upon themselves inside the simple magnetic mirror. As a result, the simple magnetic mirror suffers large plasma losses through the mirror ends. The net positive potential of the confined plasma adds to the losses since ions are confined better than electrons in a simple magnetic mirror. One early mirror confinement apparatus is disclosed in Post, U.S. Pat. No. 3,170,841, filed on July 14, 1954. The physics of a simple magnetic mirror is discussed at length in the Post patent as well as in Samuel Glasstone and Ralph H. Loveberg, Chapter 9, "Magnetic Mirror Systems," *Controlled Thermonuclear Reactions,* D. Van Nostrand Co., Inc., Princeton, New Jersey (1960), p. 336 et seq and in David J. Rose and Melville Clark, Chapter 10, "Motion of Individual Charges," *Plasmas and Controlled Fusion,* John Wiley & Son, Inc., New York (1961) p. 198 et seq.

(b) Prior Art

The problem of end losses in magnetic mirrors has been addressed in a number of ways. One approach links several mirrors together to form roughly a toroidal configuration with magnetic field lines closed inside the apparatus. Particles which leak out of one magnetic mirror simply leak into an adjacent magnetic mirror. Post noted this in FIG. 25 of U.S. Pat. No. 3,170,841, supra. Other closed systems of linked magnetic mirrors include Dandl, U.S. Pat. No. 3,728,217. Each magnetic mirror segment is independent of the next, the total effect on the toroidally confined plasma being a stabilization due to the bumpy nature of the toroidal magnetic field. No mirror cell electrostatically plugs the ends of any adjacent mirror cells. The same may be said for other linked mirror systems such as the Christofilos, U.S. Pat. No. 3,668,067. In both Dandl and Christofilos, the linked magnetic mirrors are secondary to the stabilization and confinement of the plasma, which is by means other than by electrostatic plugs.

In linked three-cell systems, the earliest prior art appears in FIG. 22 of Post, U.S. Pat. No. 3,170,841. However, Post's three-cell system does not operate as three cells simultaneously. The end cells exist as thermonuclear reaction zones alternately and do not serve to electrostatically stopper the central cell.

A three-mirror system to change the potential at the linking magnetic mirrors is suggested by G. G. Kelley, 9 Plasma Physics 503 (1967). Since electrons travel more freely through the mirroring regions than ions, the mirroring regions have a net negative charge. Thus, ions which would have mirrored are drawn deeper into the mirroring region, and some are lost. To overcome this enhanced end loss, Kelley injected cold neutral species into the mirroring regions of the center mirror cell of a three mirror cell system. The cold neutral species ionize; thus, these mirroring regions substantially lose their negative potential. Kelley did not try to make the end mirror cells electrostatic end plugs to stop end losses in the center mirror cell. He addressed a problem of enhanced end losses without touching on the basic end-loss problem in an open-ended system.

The problem of end losses in an open-ended system has not been solved by the prior art. If the loss of plasma out the ends of a mirror cell can be substantially reduced, the mirror cell will occupy an enhanced position with respect to toroidal plasma containment apparatus. The mirror cell will lose less plasma and accordingly will lose less of the energy the plasma represents.

SUMMARY OF INVENTION

The present invention provides method and apparatus for confining a plasma in a center mirror cell by use of two end mirror cells as positively charged end stoppers to minimize leakage of positive particles from the ends of the center mirror cell.

One object of the invention is to provide a mirror apparatus for plasma confinement, the apparatus comprising two spaced end mirror cells; a center mirror cell positioned adjacent to and between the two end mirror cells so as to enclose continuous magnetic field lines between the three mirror cells; two field shaping coils, each being positioned substantially adjacent to a mirroring region between the end mirror cell and the center mirror cell; a neutral beam source for each end mirror cell; target production means for generating a target plasma in each end mirror cell; and vacuum production means to produce a vacuum in the plasma confinement volume.

Other objects and advantages of the invention will become clear from the following drawings and detailed description of the invention.

DESCRIPTION OF PREFERRED EMBODIMENTS

A mirror apparatus for confining a plasma suffers from the loss of plasma which does not mirror in a mirroring region of the magnetic field. A mirroring region is a region in which a charged particle experiences an increasing magnetic field strength as it translates along an axis aligned roughly parallel with the local magnetic field lines. As the charged particle moves, the magnetic field grows to such a strength that substantially all of the energy of the charged particle is converted to orbital energy about the axis. If the axial component of kinetic energy of the charged particle is too large, the magnetic field cannot fully convert this energy to orbital energy, and the charged particle leaks out. With two mirroring regions spaced apart along magnetic field lines, a mirror cell is formed, and a charged particle may be trapped between the two mirroring regions.

Figure 1:
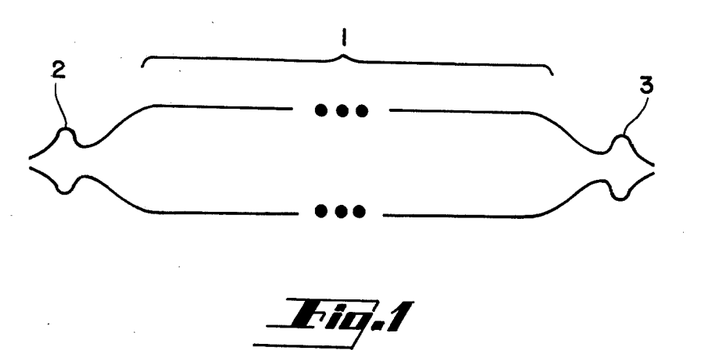
FIG. 1 is a schematic cross section of the plasma in the three mirror cells.
Figure 2:
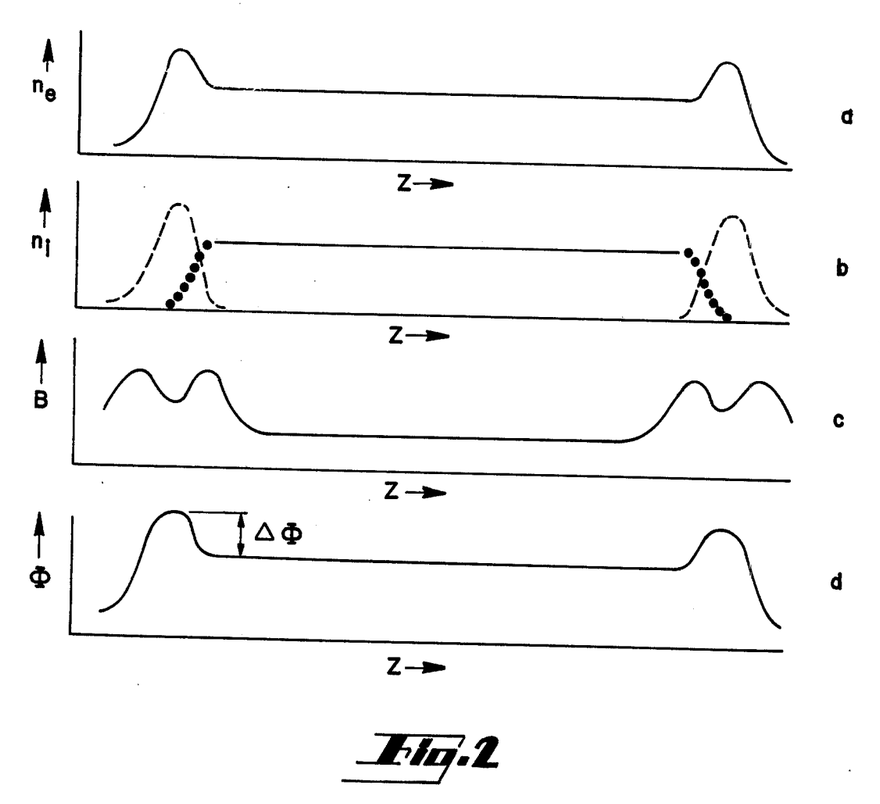
FIG. 2 comprises graphs of the electron number density, ion number density, magnetic field strength, and electrostatic potentials for the schematic in FIG. 1.

FIG. 1 is a schematic of the tandem mirror concept. A center mirror cell 1 is linked along continuous magnetic field lines beyond one mirroring region to a first end mirror cell 2 and beyond the other mirroring region to the second end mirror cell 3. Each mirror cell is viewed in the schematic substantially as the mirror cell plasmas appear in cross section. The requirements for electrostatic end stoppering are shown by the graphs in FIG. 2. In FIG. 2a, the electron number density $n_e$ is substantially constant over the center mirror cell and increases in each of the end mirror cells. The same is true for the ion number density $n_i$ displayed in FIG. 2b. The dots represent the declining number density of the ions confined in the center mirror cell while the dashed lines display the number density of the ions in the end mirror cells. FIG. 2c demonstrates that four maxima in magnetic field strength B are required to build the three linked mirror cells. Lastly, FIG. 2d shows the potential well $\Delta\Phi$ created by the net positive charge of the end mirror cell plasmas. To escape through a mirroring region, the ions in the center mirror cell must have kinetic energy great enough to overcome the potential barrier while the ion travels a spiral path along the magnetic field lines.

The continuous magnetic field lines between the mirroring regions of a mirror cell may be in many different configurations. A classical mirror cell is formed by magnetic field lines in continuous smooth curves directed outward in the center and then directed inward at each end of the mirror cell to form the mirroring regions. Mirror cells are explained in more detail in Chapter 9 of Glasstone and Loveberg, supra.

Recent work on the Baseball and 2X experiments at Lawrence Livermore Laboratory indicates that plasma confinement is enhanced by using magnetic field lines which are convex as viewed from the axis which runs through the center of both mirroring regions. This continuous curve, with no inflections is possible with a fan-shaped geometry, the spreading of the fan beyond one mirroring region being perpendicular to the spreading of the fan of the magnetic field lines beyond the other mirroring region. If the average value of the magnetic field strength increases in all directions from the center of the mirror cell, then the magnetic field is described as minimum B. For a discussion and references on the 2X Baseball, and related research see the Controlled Thermonuclear Research annual reports for 1974 and 1975 in Lawrence Livermore Laboratory reports UCRL-50002-74 (1974) and UCRL-50002-75 (1975).

Another confinement design, called the solenoid, is comprised of a succession of current-carrying coils, each of which is circular and coaxial with the others. There may be as few as two current-carrying coils which, if spaced further than a coil radius apart, form a mirror cell. The plane of each current-carrying coil is a maximum of magnetic field strength, a mirroring region. The space between the mirroring regions contains a magnetic field which is a minimum midway between the mirroring regions and which increases as a charged particle moves toward either mirroring region. For current-carrying coils which are spaced apart no more than a coil radius, the mirroring regions may be set up by current-carrying coils at the ends of the solenoid by well-known methods.

To attain a minimum B magnetic field in a solenoid, Ioffe bars may be added. Ioffe bars are a set of linear conductors arrayed evenly spaced in pairs of opposite current direction about the periphery of the solenoid interior. Ioffe bars set up a cusp magnetic field which adds to the interior magnetic field of the solenoid to create a magnetic field strength at a minimum along the axis of the solenoid and on the increase radially outward from the axis of the solenoid. Necessarily, Ioffe bars tend to compress the plasma inside the solenoid.

To smooth the plasma flow between linked mirror cells, an array of field shaping coils may be inserted about the adjoining mirroring regions. The array may include a mixture of current-carrying coils with linear Ioffe bars. Both the current-carrying coils and the Ioffe bars shape the magnetic field lines. This shaping includes compressing or distending the magnetic field lines coming from one mirror cell and going into the next. Current carrying coils which do this may be called "C" coils. Either "C" coils or Ioffe bars may provide sufficient magnetic field shaping to prevent plasma instabilities.

Plasma instabilities arise at abrupt magnetic field changes. Maintaining the smooth motion of charged particles in a magnetic field has the advantage that a charged particle tends to continue to encircle the same set of magnetic field lines inside the mirror cell. Magnetic field lines which appear concave when viewed from the axis running through the mirroring regions have "bad" curvature. Bad curvature can lead to plasma instabilities, and the ends of a solenoid have bad curvature. However, if the region of bad curvature is not too long compared to the ion Larmor radius, the charged particles tend to pass through the bad curvature region without instabilities developing. Further, the end mirror cells tend to anchor the magnetic field lines so that the magnetic field lines in regions of bad or no curvature do not distort.

The approach of end stoppering requires that the end mirror cells develop a sufficient positive charge to confine most of the positively charged particles in the center mirror cell. A balance must exist between density and average energy of the plasmas in the end mirror cells vis-a-vis the plasma in the center mirror cell. The more energetic the negatively charged electrons are, the deeper the potential well set up by the end mirror cell plasmas can be. The denser the end mirror cell plasmas are, the higher the positive charge they develop.

The balance for proper plasma confinement is maintained by adjusting the plasma densities and temperatures in the end and center mirror cells. Since electrons travel freely between the end mirror cells and the center mirror cell and suffer many collisions among themselves before finally escaping, the electron temperature $T_e$ may be taken to be the same in the end mirror cells and in the center mirror cell. The invention maintains dense plasmas in the end mirror cells by continuously injecting neutral beams into the end mirror cell plasmas. Positively charged particle losses in the center mirror cell may be replaced by neutral beams, gas, or pellets which ionize upon contacting the center mirror cell plasma. The three mirror cells are heated by the neutral beams used to maintain the density of the end mirror cells. Other heating sources may be used, but sufficient heating is available by use of neutral beams at an energy level slightly above the energy desired for the positively charged particles in the end mirror cells. The electrons carry a net positive energy from the end mirror cells to the center mirror cell. The average end mirror cell ion energy is much greater than the temperature of the electrons $T_e$, which in turn is greater than the temperature $T_c$ of the positively charged particles in the center mirror cell.

Imposing the requirements of equilibrium and quasi-neutrality and assuming a Boltzmann distribution for electrons, there is established a potential difference $\Phi_c$ between the end mirror cells and the center mirror cell of the order of $$\Phi_c = T_e \ln\left(\frac{n_p}{n_c}\right)$$

where
$n_p$ is the number density of the positively charged particles in the end mirror cells
$n_c$ is the number density of the positively charged particles in the center mirror cell.

Center mirror cell positively charged particles with energies less than $\Phi_c$ are confined in this potential well for a time $\tau_c$ required to diffuse upward in energy above the barrier height. For $\Phi_c \geq 2T_c$, $\tau_c$ is given by Pastukhov, 14 Nuclear Fusion 3(1974):

$$\tau_c = \tau_{ii} g(R) \left(\frac{\Phi_c}{T_c}\right) \exp \frac{\Phi_c}{T_c}$$

where $\tau_{ii}$ is the ion-ion collision time $$g(R) = \sqrt{\pi} \, (2R + 1) \ln (4R + 2)/4R$$

$$R = \frac{B(\text{mirror})}{B(\text{solenoid})}$$

The above equations yield $$\tau_c = \tau_{ii} g(R) \left(\frac{T_e}{T_c}\right) \ln\left(\frac{n_p}{n_c}\right) \left(\frac{n_p}{n_c}\right)^{T_e/T_c}$$

Thus, the confinement time $\tau_c$ for positively charged particles in the center mirror cell may be chosen by varying the ratios of $T_e/T_c$ and $n_p/n_c$. In principle any enhancement of $\tau_c$ over $\tau_{ii}$ is possible. Thus, the confinement time of the center mirror cell plasma is greater than in a simple mirror cell having no end mirror cells. A discussion of end stoppering may be found in T. K. Fowler, End Stoppering in Mirror Machines, Lawrence Livermore Laboratory Report UCID-17244 (1976).

The present invention includes two end mirror cells, which leak some charged particles. To compensate for the loss of these charged particles, a source of additional plasma must be provided, here a neutral beam source. In a neutral beam source, ions are extracted from a plasma; are accelerated through a potential difference; and are neutralized. The result is a neutral beam of neutral atoms of the derived species and at a chosen energy. When the beam of neutral atoms is directed at a plasma inside of a mirror confinement apparatus, the neutral atoms travel through the magnetic field undeflected. Upon contacting the mirror cell plasma, the neutral atoms are ionized and move along magnetic field lines. Thus, additional charged particles are added to the mirror cell plasma to replace the losses through the mirroring regions. The present invention may include a neutral beam source injecting into the center mirror cell as well.

Another plasma source is a streaming gun, which injects ionized species along magnetic field lines into a mirror cell. Streaming guns are used for two purposes. First, one may create a target plasma for startup. The target plasma is a relatively cold, tenuous mirror cell plasma which serves to ionize the atoms in the neutral beams upon contact. Thus, the energetic neutral beam atoms become a source of building up the number density and temperature of the mirror cell plasma. An alternate method for generating a target plasma injects a small pellet of appropriate material such as $NH_3$ or frozen deuterium into the center of the magnetic field of a mirror cell and then ionizes the pellet material with a laser. Discussion of these two current methods are not intended to exclude use of other target production means.

Also, a streaming gun is employed to stabilize a mirror cell plasma. This is especially true in relatively small experimental devices such as the 2XIIB experiment to more or less a degree in larger devices of the future. In a classical mirror cell and in the two end mirror cells of the present invention, lower-energy, positively charged particles leak out of the mirror cell faster than higher-energy, positively charged particles. If the Maxwellian distribution of the energy of mirror cell plasma is perturbed, and depending on other circumstances, microinstabilities may result. The microinstabilities lead to plasma disruption and loss. The 2XIIB experiment at Lawrence Livermore Laboratory demonstrates that a supply of positively charged particles at the energies lost to the mirror cell can prevent formation of microinstabilities. One method of supplying these positively charged particles is to run streaming guns at an energy from the lower energy portion of the mirror cell plasma. The same streaming guns which provide the startup plasma may be used if they have a high and a low current mode of operation. Stabilization requires much less plasma current than formation of a target plasma. Separate streaming guns may be used as well.

Stabilizing the plasma may be accomplished by injection of neutral species at the lower energy range of the mirror cell plasma. Another method of supplying the neutral species is the gas box, used on the 2XIIB experiment. The gas, made of neutral species of the mirror cell plasma, enters the mirror cell across magnetic field lines just as with a neutral beam source. With the gas box placed at the mirroring region of the mirror cell, the gas moves across more magnetic field lines in a given distance before being ionized. Thus, the resulting cold ionized species go out into the mirror cell distributed over many magnetic field lines. An appropriate neutral beam source could perform much the same function as the gas box. B. G. Logan, et al, 37 Physical Review Letters 1468 (Nov. 29, 1976) describes the gas box in use on the 2XIIB experiment.

Vacuum pumping means for evacuating the interior of the plasma confinement apparatus are comprised of a state of the art system to reach and maintain vacuums on the order of $10^{-6}$ Torr. Such systems include mercury diffusion pumps, gettering, and cryopanels. A standard reference on vacuum technology is Saul Dushman, *Scientific Foundations of Vacuum Techniques*, 2d Ed., Wiley, New York (1962).

Figure 3:
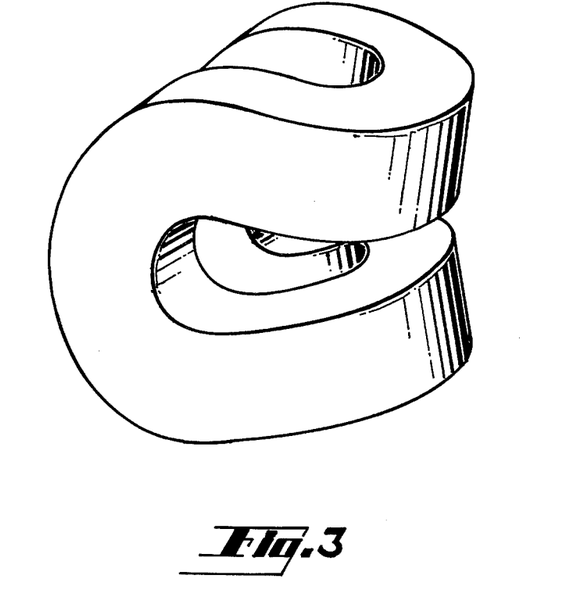
FIG. 3 is a perspective view of a baseball coil geometry for producing a minimum B magnetic field.
Figure 4:
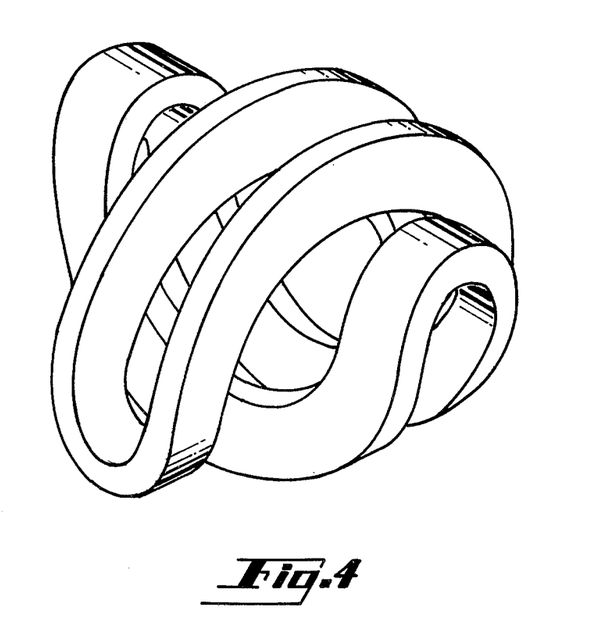
FIG. 4 is a perspective view of a Yin-Yang pair geometry for producing a minimum B magnetic field.

The end mirror cells must provide a magnetic field which will contain a stable plasma. Current technology requires that these magnetic fields be minimum B. However, it may yet prove possible to use simple circular coils together with sufficient cold plasma to maintain electrical contact between the mirror cell and the metallic end walls of the machine (called "line tying"). As with the solenoid and Ioffe bars, a minimum B magnetic field is one in which the average value of the magnetic field strength increases in all directions from the center of the mirror cell. One current-carrying coil array for setting up a minimum B magnetic field is the baseball coil, shown in FIG. 3. The name derives from the baseball coil being shaped as is the seam on a baseball. Another minimum B magnetic field may be created by a Yin-Yang pair, shown in FIG. 4. For more information see R. W. Moir and R. F. Post, 9 Nuclear Fusion 253 (1969). Lawrence Livermore Laboratory has performed experiments which have proven that the magnetic fields are minimum B, the Baseball series for the baseball coil and the 2X series for the Yin-Yang pair. Either current-carrying coil is appropriate for the end mirror cells of the present invention. This is not to limit the scope of the idea; the novelty is in the small dense end mirror cells electrostatically plugging the ends of the center mirror cell. Any stable configuration is sufficient as long as the end mirror cell plasmas are dense enough and form their net positive potential.

There are several choices of conductors for the current-carrying coils. Superconductors require less power to operate than normal conductors. The solenoid could be made of superconducting current-carrying coils. However, with contemplated end mirror cell designs requiring magnetic fields on the order of 25 Tesla, only normal conductors could carry the necessary current at the present level of technology. A normal conductor such as copper or aluminum may be used. Such a normal conductor may be cooled, but not necessarily to cryogenic temperatures. A cooling medium may be liquid nitrogen at 77° K. or water. However, aluminum expands and contracts at a different rate from the structural steel to be used around the conductor. To avoid an aluminum conductor being put in tension, a liquid metal may be employed as a conductor. Such a liquid metal could be molten aluminum.

Figure 5:
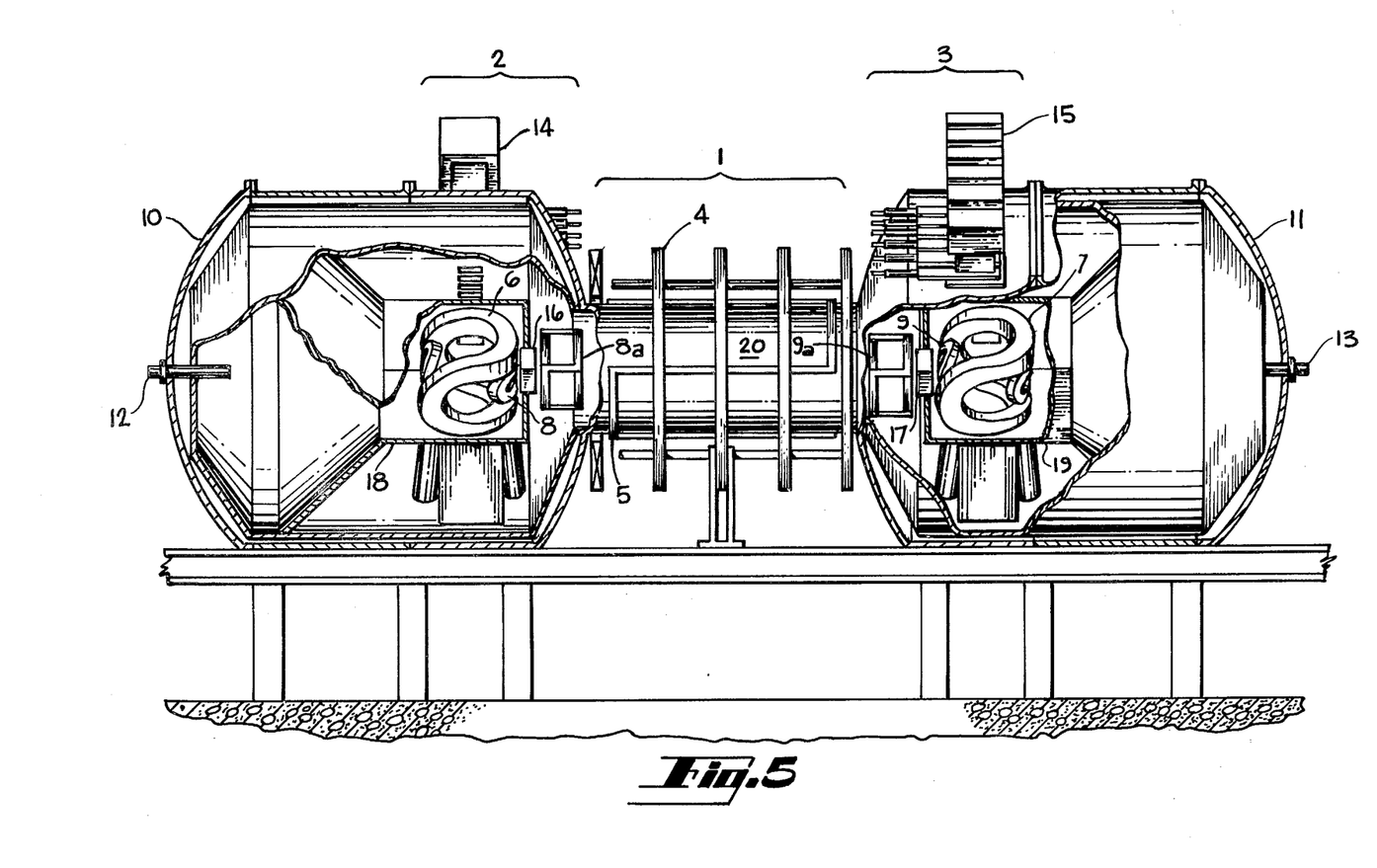
FIG. 5 is a side view of a preferred embodiment of the tandem mirror plasma confinement apparatus, employing a baseball coil geometry, a source gas box to supply cold neutral species to the center mirror cell, and a target plasma streaming source for startup of each end mirror cell.

The preferred embodiment is the Lawrence Livermore Laboratory design for a small-scale tandem mirror plasma confinement apparatus. As shown in FIG. 5, the plasma confinement apparatus comprises three mirror cells. The center mirror cell 1 is positioned between the first end mirror cell 2 and the second end mirror cell 3. The center mirror cell 1 is a solenoid of discrete current-carrying coils 4 with Ioffe bars 5. The minimum B magnetic field may not be needed in the solenoid; thus, the Ioffe bars 5 may or may not be needed. The first end mirror cell 2 contains a current-carrying coil 6 of the baseball geometry. The second end mirror cell 3 contains a current-carrying coil 7 of the baseball geometry. However, the magnetic field line compression of current-carrying coil 7 is oriented 90° with respect to that of the current-carrying coil 6 about the axis running down the center of the three mirror cells. The result is a spread of magnetic field lines laterally from the exterior mirroring region of the first end mirror cell 2 and vertically from the exterior mirroring region of the second end mirror cell 3. Located next to the adjacent mirroring region and between the ends of the current-carrying coil 6 is a first "C" coil 8 which substantially follows the form of the interior sides of the ends of current-carrying coil 6. The first "C" coil 8 completes its coil loop such that the hole in the center is large enough that the first "C" coil does not block flow of the first end mirror cell plasma. A second "C" coil 9 is located likewise between the ends of current carrying coil 7. The second "C" coil substantially follows the form of the interior sides of the ends of current-carrying coil 6.

Second "C" coil 9 completes its coil loop such that the hole in the center is large enough that the second "C" coil does not block flow of the second end mirror cell plasma. The first transition Ioffe bars 8a shape the magnetic field lines between the first end mirror cell 2 and the center mirror cell 1. The second transition Ioffe bars 9a shape the magnetic field lines between the second end mirror cell 3 and the center mirror cell mirror cell 1.

The first end mirror cell 2 is surrounded by a first end mirror cell vacuum vessel 10, as is the second end mirror cell 3 surrounded by the second end mirror cell vacuum vessel 11. Located past the exterior mirroring region of the first end mirror cell 2 and on the axis running down the center of the three mirror cells is a plasma streaming source. The first target plasma streaming source 12 is mounted to extend through a vacuum sealed port in the first end mirror cell vacuum vessel 10. The second target plasma streaming source 13 is similarly mounted through a vacuum sealed port in the second end mirror cell vacuum vessel 11 on axis past the exterior mirroring region of the second end mirror cell 3.

First end mirror cell 2 has the first neutral beam sources 14 arrayed to project their neutral beams toward the center of the first end mirror cell 2. Two groups of six neutral beam sources each are placed radially about the first end mirror cell 2 in a plane passing through the center of the first end mirror cell 2 and perpendicular to the axis running down the center of the three mirror cells. Each of the groups of six neutral beam sources is centered about a line 45° from the vertical. The second neutral beam sources 15 are arranged similarly about the second end mirror cell 3. A first cold neutral species source is a first gas box 16 located about the adjacent mirroring region of the first end mirror cell 2. The first gas box 16 surrounds the adjacent mirroring region such that the pressurized neutral gas enters the adjacent mirroring region. A second cold neutral species source is second gas box 17 located similarly about the adjacent mirroring region of the second end mirror cell 3 to supply neutral gas under pressure to the adjacent mirroring region.

For the vacuum pumping means, cryopanel surfaces are disposed in first cryopanel box 18 about the first current-carrying coil 6. Holes for the neutral beams and the neutral beam dump are provided in the first cryopanel box sides which are arranged to face the neutral beams in an average perpendicular manner. The cryopanel surfaces are also disposed about the interior of the exterior ends of the first end mirror cell vacuum vessel 10. Cryopanel surfaces are likewise distributed in the second end mirror cell 3 with a second cryopanel box 19 about the second current-carrying coil 7. Titanium gettering wire of 3 mm diameter and 85% Ti-15% Ta provides pumping by titanium sublimation on liquid nitrogen cooled cryopanels. Also, three Edwards mercury diffusion pumps are employed to reach the base pressure inside the three connected vacuum vessels of $10^{-8}$ Torr before a plasma confinement run. After the plasma confinement run of 25 milliseconds, the end mirror cells are at $10^{-6}$ Torr and the center mirror cell is at $10^{-6}$ Torr.

Sources of neutral atoms are characterized by the flow rate and energy of the neutrals. Each of the four groupings of six neutral beam sources are designed to deliver approximately 155 Torr-liters per second. For the two gas boxes, each has a flow rate of 13 Torr-liters per second. A standard molecular Torr-liter per second is equal to $3.29 \times 10^{19}$ molecules per second or 5.28 molecular "amperes". In terms of amperes of neutral species, the 40 keV neutral beam sources produce about 40 amperes, the 20 keV neutral beam sources produce about 50 amperes, and each gas box produces about 150 amperes. Each group of six neutral beam sources contains four 20 keV and two 40 keV sources. The neutral beam sources are 3.2 meters from the axis running through the three mirror cells. The vacuum system must be able to handle the gas load from the neutral beam sources, gas boxes, and end losses. Gas dumps are on the opposite sides of the end mirror cells from each of the groups of six neutral beam sources to pump off the neutrals which are not ionized. Further, gas dumps exist to pump the charged particles which leak out the exterior, mirroring regions of each of the end mirror cells.

Physical dimensions of the preferred embodiment include an overall length from end mirror cell vacuum vessel 10 to end mirror cell vacuum vessel 11 of 14.0 meters. Each end mirror cell vacuum vessel is 5.45 meters long. The length from the center of the center mirror cell 1 to the center of the end mirror cell 2 is 3.2 meters. The same length exists between the centers of center mirror cell 1 and end mirror cell 3. The first and second end mirror cell vacuum vessels are 15 feet in diameter, and the center mirror cell vacuum vessel 20 is 64 inches in diameter.

Operational characteristics of the preferred embodiment include parameters of the magnetic field and plasma. The distance between the adjacent (or interior) mirroring regions of the end mirror cells is 5.5 meters. For each end mirror cell, the distance between exterior and adjacent mirroring regions is 0.9 meters; the magnetic field strength at the center is 1.0 Tesla; the axial mirror ratio is 1.5 to 2.0; the radial mirror ratio is 0.98 to 1.05; the radial well depth is 0.98 to 1.05; the maximum plasma radius is 0.2 meters; the ion density is $5 \times 10^{13}$ ions/cm$^3$; the ion temperature is 26 keV; and the electron temperature is approximately 200 eV. For the center mirror cell, the magnetic field strength in the center is 0.1 to 0.3 Tesla; the maximum plasma radius is 0.6 meters; the ion density is $1 \times 10^{13}$ ions/cm$^3$; the ion temperature is 100 eV; and the electron temperature is 200 eV.

The dimensions of baseball coils and associated "C" coils for the end mirror cells are the upper bounds for the size of the end mirror cell plasmas. The baseball coils have a square cross section 30 cm on a side of wound copper square tubing with the stainless steel casing about the windings. The radius of curvature of the baseball coils to the center of the windings is 44 cm. The baseball coil is symmetric with the centers for the radii of curvature 10 cm apart, and each of these non-overlapping radii of curvature have a center 5 cm from the center of the space enclosed by the baseball coil.

The "C" coils are located between the ends of the baseball coil symmetrically about the axis which runs through the end mirror cell mirroring regions. For the long curved surface of a "C" coil, the radius of of curvature is 70 cm, with the center of curvature on the axis through the end mirror cell mirroring regions. This curve continues over a half-angle of 33°, at which point the "C" coil straightens out to form the end curve orthoginal to the direction of the 33° curve. The radius of curvature of the end curve is 15 cm. The "C" coil is wound with copper tubing and is encased in stainless steel for a cross section 15 cm on a side square.

The "C" coils encircle the plasma as it passes between the ends of the baseball coil. The "C" coils shape the plasma which passes between the elliptical cross section of the end mirror cells and the circular cross section of the solenoid. A circular cross section for the plasma leaking out of the exterior mirroring region of each of the end mirror cells spreads out the energy density and number density of the charged particles to be pumped off by the vacuum system. The baseball coils and the "C" coils are supported by numerous tie rods, clamps, and supports to withstand the forces on these current-carrying coils during operation.

Transition Ioffe bars shape the magnetic field and associated plasma in the adjacent mirroring regions as well. Both the first and second transition Ioffe bars have four conductors, each being about 50 cm long and parallel to the axis through the end mirror cell mirroring regions. The transition Ioffe bars aid in maintaining the smooth flow of the plasma between mirror cells when current is varied in the nearest "C" coil. Current is varied in the "C" coil to vary the mirror ratios and well depths of the end mirror cells.

Figure 6:
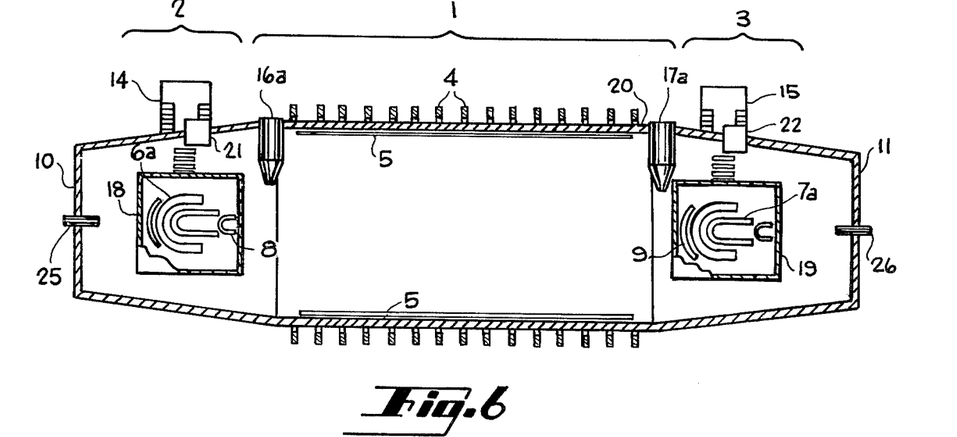
FIG. 6 is a side view of a first alternative embodiment of the tandem mirror plasma confinement apparatus, employing Yin-Yang pair geometry, a cold neutral beam source to supply cold neutral species to the center mirror cell, a plasma streaming source to stabilize the end mirror cells, and a target pellet generation and laser ionization system for startup of each end mirror cell.

FIG. 6 is a side view of a first alternative embodiment of the tandem mirror plasma confinement apparatus. The current-carrying coils 6a and 7a are of the Yin-Yang pair geometry and produce a multi-Tesla, minimum B magnetic field in end mirror cells 2 and 3, respectively. The first cold neutral beam source 16a injects cold neutral species into center mirror cell 1 near the mirroring region adjacent to the first end mirror cell 2. The second cold neutral beam source 17a injects cold neutral species into the center mirror cell near the mirroring region adjacent to the second end mirror cell 3. The first and second cold plasma streaming sources, 25 and 26, provide a cold plasma stream moving down exterior magnetic field lines to stabilize the first and second end mirror cells, respectively. The first target production means is the first target pellet generation and laser ionization system 21 for startup of the first end mirror cell. The second target production means is the second target pellet generation and laser ionization system 22 for startup of the second end mirror cell. The current-carrying coils of the solenoid have a constant radius.

Figure 7:
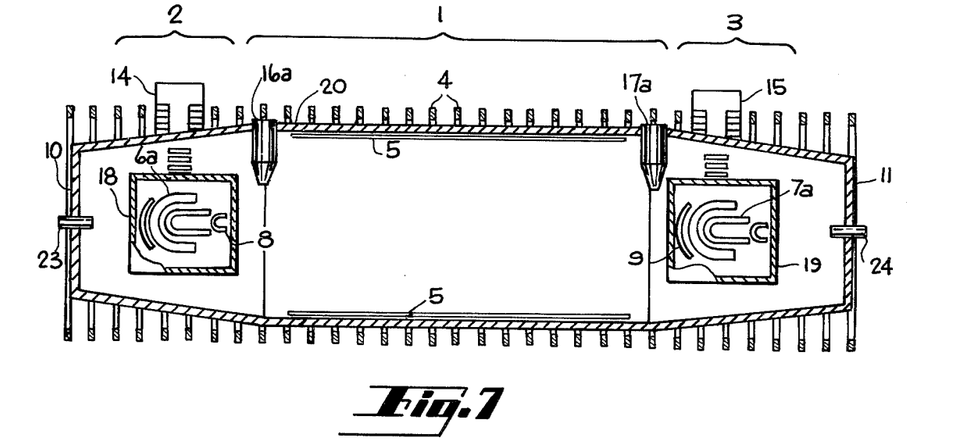
FIG. 7 is a side view of a second alternative embodiment of the tandem mirror plasma confinement apparatus, employing Yin-Yang pair geometry, extended current-carrying coils of the solenoid to cover the end mirror cells as well as the center mirror cell, a plasma streaming source used in a high-current mode for target generation and a low-current mode for end mirror cell stabilization, and a cold neutral species source for the center mirror cell.

FIG. 7 is a side view of a second alternative embodiment of the tandem mirror plasma confinement apparatus. The current-carrying coils 6a and 7a are of the Yin-Yang pair geometry and produce a multi-Tesla, minimum B magnetic field in end mirror cells 2 and 3, respectively. The current-carrying coils of the solenoid extend over the first and second end mirror cells as well as over the center mirror cell. The first and second cold neutral beam sources 16a and 17a inject cold neutral species into the center mirror cell near the mirroring regions adjacent to the first and second end mirror cells, respectively. The first two-state plasma streaming source 23 and the second two-state plasma streaming source 24 provide the targets for startup of the first and second end mirror cells, respectively. The first two-state plasma streaming source 23 and the second two-state plasma streaming source 24 provide the cold streaming plasma for stabilization of the first and second end mirror cells, respectively. The plasma necessary for a target is more dense than the cold streaming plasma for stabilization. Since a streaming plasma source produces ions, the density of the plasma stream produced may be charaterized as a current. Production of a target plasma is therefore a high-current mode of operation while production of a cold streaming plasma for stabilization is a low-current mode.

Figure 8:
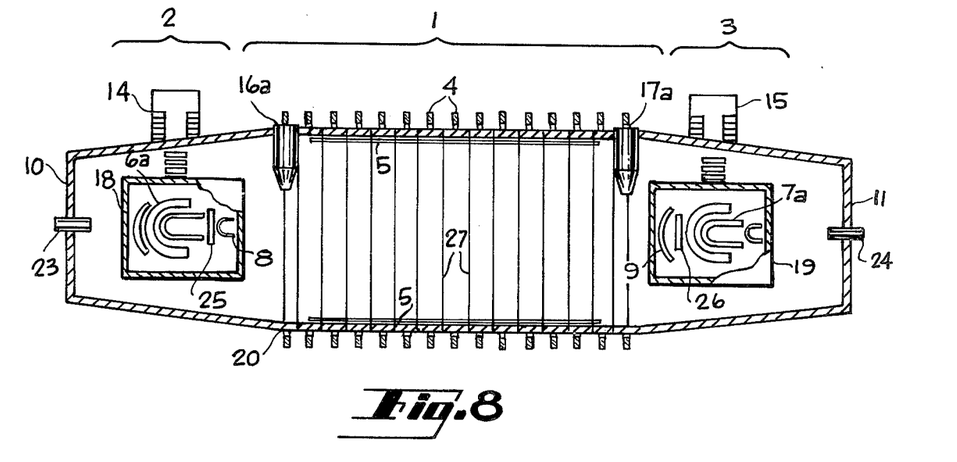
FIG. 8 is a side view of a third alternative embodiment of the tandem mirror plasma confinement apparatus, employing a Yin-Yang pair geometry, a stabilization gas box to stabilize the end mirror cells, a plasma streaming source for startup of each end mirror cell, a cold neutral species source for the center mirror cell, and a plurality of modular sections comprising the center mirror cell.

FIG. 8 is a side view of a third alternative embodiment of the tandem mirror plasma confinement apparatus. The current-carrying coils 6a and 7a are of the Yin-Yang pair geometry and produce a multi-Tesla, minimum B magnetic field in end mirror cells 2 and 3, respectively. The first and second cold neutral beam sources 16a and 17a inject cold neutral species into the center mirror cell near the mirroring regions adjacent to the first and second end mirror cells, respectively. The first cold plasma generating means is a first stabilization gas box 25 feeding cold neutral species under pressure into the interior mirroring region of the first end mirror cell where the cold neutral species become ionized and move down magnetic field lines into the first end mirror cell. The second cold plasma generating means is a second stabilization gas box 26 feeding cold neutral species under pressure into the interior mirroring region of the second end mirror cell where the cold neutral species become ionized and move down magnetic field lines into the second end mirror cell. The center mirror cell 1 is composed of substantially similar sections 27, each with associated current-carrying coils 4, Ioffe bars 5 and the center mirror cell vacuum vessel 20.

This invention has been described by way of illustration rather than limitation, and it should be apparent that it is equally applicable in fields other than those described.

I claim:

1. Plasma confinement apparatus comprising:
   a first end mirror cell comprising an array of current-carrying coils, arranged to produce a minimum B magnetic field of multi-Tesla strength at the current-carrying coils;
   a second end mirror cell comprising an array of current-carrying coils, arranged to produce a minimum B magnetic field of multi-Tesla strength at the current-carrying coils;
   a center mirror cell, positioned between the first end mirror cell and the second end mirror cell so as to enclose continuous magnetic field lines between the first end mirror cell and the second end mirror cell, the center mirror cell comprising a solenoid of discrete current-carrying coils;
   the magnetic field strength at the current-carrying coils of the solenoid being less than the magnetic field strength at the current-carrying coils of the first or second end mirror cell;
   a first field shaping coil positioned about the magnetic field lines passing between the interiors of the first end mirror cell and the center mirror cell so as to shape the magnetic field lines from an elliptical cross section on the first end mirror cell side of the first field shaping coil to a circular cross section on the center mirror cell side of the first field shaping coil;
   a second field shaping coil positioned about the magnetic field lines passing between the interiors of the second end mirror cell and the center mirror cell so as to shape the magnetic field lines from an elliptical cross section on the second end mirror cell side of the second field shaping coil to a circular cross section on the center mirror cell side of the second field shaping coil;
   a first neutral beam source to introduce energetic neutral species of the plasma to be confined into the first end mirror cell so as to maintain a higher density and temperature for positively charged particles in the first end mirror cell than in the center mirror cell;
   a second neutral beam source to introduce energetic neutral species of the plasma to be confined into the second end mirror cell so as to maintain a higher density and temperature for the resulting positively charged particles in the second end mirror cell than in the center mirror cell;
   a first target production means for generating a target plasma in the first end mirror cell for startup;
   a second target production means for generating a target plasma in the second end mirror cell for startup;

a vacuum pumping means for evacuating the inside of the plasma confinement apparatus;

whereby the first end mirror cell and the second end mirror cell plasma each develop a net positive charge, the center mirror cell plasma develops a net negative charge, and the first and second end mirror cell plasmas repel positively charged particles contained in the center mirror cell.

2. Apparatus according to claim 1, wherein there is a first cold plasma generating means for introducing a cold plasma into the first end mirror cell to stabilize the first end mirror cell plasma.

3. Apparatus according to claim 2, wherein there is a second cold plasma generating means for introducing a cold plasma into the second end mirror cell to stabilize the second end mirror cell plasma.

4. Apparatus according to claim 1, wherein the first end mirror cell and the second end mirror cell are substantially identical and have substantially identical magnetic fields associated therewith.

5. Apparatus according to claim 1, wherein a first cold neutral species source introduces cold neutral species of the plasma to be confined into the center mirror cell near the first end mirror cell.

6. Apparatus according to claim 5, wherein a second cold neutral species source introduces cold neutral species of the plasma to be confined into the center mirror cell near the second end mirror cell.

7. Apparatus according to claim 1, wherein the magnetic field strengths at the current-carrying coils for each of the first and second end mirror cells lie substantially in the range of one to 30 Tesla.

8. Apparatus according to claim 1, wherein the length of the center mirror cell, which continues the magnetic field lines between the first and second end mirror cells, is variable by a change in number of substantially similar modular sections.

9. Apparatus according to claim 1, wherein the array of current-carrying coils in the first end mirror cell is comprised of a Yin-Yang pair.

10. Apparatus according to claim 9, wherein the array of current-carrying coils in the second end mirror cell is comprised of a Yin-Yang pair.

11. Apparatus according to claim 1, wherein the array of current-carrying coils in the first end mirror cell is comprised of a baseball coil.

12. Apparatus according to claim 11, wherein the array of current-carrying coils in the second end mirror cell is comprised of a baseball coil.

13. Apparatus according to claim 1, wherein the solenoid of the center mirror cell extends over the first and second end mirror cells.

14. Apparatus according to claim 1, wherein the solenoid has a constant radius for each current-carrying coil which makes up the solenoid.

15. Apparatus according to claim 3, wherein the first cold plasma generating means is a first plasma streaming source to introduce a cold plasma stream moving down exterior magnetic field lines into the first end mirror cell for stabilization.

16. Apparatus according to claim 15, wherein the second cold plasma generating means is a second plasma streaming source to introduce a cold plasma stream moving down exterior magnetic field lines into the second end mirror cell for stabilization.

17. Apparatus according to claim 3, wherein the first cold plasma generating means is a first stabilization gas box feeding cold neutral species under pressure into the interior mirroring region of the first end mirror cell where the cold neutral species become ionized and move down magnetic field lines into the first end mirror cell.

18. Apparatus according to claim 17, wherein the second cold plasma generating means is a second stabilization gas box feeding cold neutral species under pressure into a mirroring region of the second end mirror cell where the cold neutral species become ionized and move down magnetic field lines into the second end mirror cell.

19. Apparatus according to claim 3, wherein the first cold plasma generating means is the center mirror cell leaking center mirror cell plasma along the continuous magnetic field lines into the first end mirror cell.

20. Apparatus according to claim 19, wherein the second cold plasma generating means is the center mirror cell leaking center mirror cell plasma along the continuous magnetic field lines into the second end mirror cell.

21. Apparatus according to claim 6, wherein the first cold neutral species source is a first source gas box located about the mirroring region of the center mirror cell adjacent to the first end mirror cell.

22. Apparatus according to claim 21, wherein the second cold neutral species source is a second source gas box located about the mirroring region of the center mirror cell adjacent to the second end mirror cell.

23. Apparatus according to claim 6, wherein the first cold neutral species source is a first cold neutral beam source located about the mirroring region of the center mirror cell adjacent to the first end mirror cell.

24. Apparatus according to claim 23, wherein the second cold neutral species source is a second cold neutral beam source located about the mirroring region of the center mirror cell adjacent to the second end mirror cell.

25. Apparatus according to claim 1, wherein the first target production means is a first target plasma streaming source generating a cold plasma stream moving down exterior magnetic field lines into the first end mirror cell, the cold plasma stream acting to create the target plasma.

26. Apparatus according to claim 25, wherein the second target production means is a second target plasma streaming source generating a cold plasma stream moving down exterior magnetic field lines into the second end mirror cell, the cold plasma stream acting to create the target plasma.

27. Apparatus according to claim 3, wherein the first target production means is a first two-state plasma streaming source operated in a high-current mode.

28. Apparatus according to claim 27, wherein the second target production means is a second two-state plasma streaming source operated in a high-current mode.

29. Apparatus according to claim 3, wherein the first cold plasma generating means is a first two-state plasma streaming source operated in a low-current mode.

30. Apparatus according to claim 29, wherein the second cold plasma generating means is a second two-state plasma streaming source operated in a low-current mode.

31. Apparatus according to claim 1, wherein the first target production means is a first target pellet generation and laser ionization system.

32. Apparatus according to claim 31, wherein the second target production means is a second target pellet generation and laser ionization system.

33. A method for confining plasma comprising producing a minimum B magnetic field of multi-Tesla strength at an array of current-carrying coils comprising a first end mirror cell;
producing a minimum B magnetic field of multi-Tesla strength at an array of current-carrying coils comprising a second end mirror cell;
positioning a center mirror cell having a solenoid of discrete current-carrying coils between the first end mirror cell and the second end mirror cell so as to enclose continuous magnetic field lines between the first end mirror cell and the second end mirror cell;
producing a magnetic field at the current-carrying coils of the solenoid which is less than the magnetic field strength at the current-carrying coils of the first or second end mirror cell;
positioning a first field shaping coil about the magnetic field lines passing between the interiors of the first end mirror cell and the center mirror cell so as to shape the magnetic field lines from an elliptical cross section on the first end mirror side of the first field shaping coil to a circular cross section on the center mirror cell side of the first field shaping coil;
positioning a second field shaping coil about the magnetic field lines passing between the interiors of the second end mirror cell and the center mirror cell so as to shape the magnetic field lines from an elliptical cross section on the second end mirror cell side of the second field shaping coil to a circular cross section on the center mirror cell side of the second field shaping coil;
introducing an energetic neutral species of plasma to be confined into the first end mirror cell by means of a first neutral beam source so as to maintain a higher density and temperature for positively charged particles in the first end mirror cell than in the center mirror cell;
introducing an energetic neutral species of plasma to be confined into the second end mirror cell by means of a second neutral beam source so as to maintain a higher density and temperature for the resulting positively charged particles in the second end mirror cell than in the center mirror cell;
generating a target plasma in the first end mirror cell for startup with a first target production means;
generating a target plasma in the second end mirror cell for startup with a second target production means;
evacuating the inside of the plasma confinement apparatus;
whereby the first end mirror cell and the second end mirror cell plasma each develop a net positive charge, the center mirror cell plasma develops a net negative charge, and the first and second end mirror cell plasmas repel positively charged particles contained in the center mirror cell.

34. A method as in 33, wherein the plugging is accomplished electrostatically.